United States Patent
Sundstrom

(10) Patent No.: US 11,252,946 B2
(45) Date of Patent: Feb. 22, 2022

(54) FISHING LURE WITH INTERNAL BAITWELL

(71) Applicant: ODIN LURE, LLC, Hudson, NH (US)

(72) Inventor: Robert Sundstrom, Hudson, NH (US)

(73) Assignee: ODIN LURE, LLC, Hudson, NH (US)

( * ) Notice: Subject to any disclaimer, the term of this patent is extended or adjusted under 35 U.S.C. 154(b) by 148 days.

(21) Appl. No.: 16/547,972

(22) Filed: Aug. 22, 2019

(65) Prior Publication Data

US 2020/0085023 A1 Mar. 19, 2020

Related U.S. Application Data

(60) Provisional application No. 62/722,492, filed on Aug. 24, 2018.

(51) Int. Cl.
*A01K 85/01* (2006.01)
*A01K 85/08* (2006.01)

(52) U.S. Cl.
CPC .............. *A01K 85/01* (2013.01); *A01K 85/08* (2013.01)

(58) Field of Classification Search
CPC ...................................................... A01K 85/01
USPC ......................................................... 43/42.06
See application file for complete search history.

(56) References Cited

U.S. PATENT DOCUMENTS

| | | | | |
|---|---|---|---|---|
| 3,269,050 A | * | 8/1966 | Garwood | A01K 85/00 43/42.33 |
| 4,520,588 A | * | 6/1985 | Hindermyer | A01K 85/01 43/17.6 |
| 4,741,120 A | * | 5/1988 | Cota | A01K 85/01 43/17.5 |
| 4,777,757 A | * | 10/1988 | de Marees van Swinderen | A01K 85/01 43/41 |
| 5,207,016 A | * | 5/1993 | Pate | A01K 85/00 43/42.28 |
| 6,357,167 B1 | * | 3/2002 | Bradford | A01K 85/00 43/42.05 |
| 6,675,525 B1 | * | 1/2004 | Ford | A01K 85/01 43/42.05 |
| 7,228,656 B2 | * | 6/2007 | Mitchell | A01K 85/01 43/42.06 |
| 7,383,659 B1 | * | 6/2008 | Honkanen | A01K 85/01 43/26.2 |
| 8,402,687 B1 | * | 3/2013 | Jarrell | A01K 85/01 43/42.28 |

(Continued)

*Primary Examiner* — Christopher P Ellis
(74) *Attorney, Agent, or Firm* — Finch & Maloney, PLLC; Michael Bujold; Jay Franklin

(57) ABSTRACT

An improved fishing lure which comprises a main body which has a baitwell. A body bore extends through the main body and is sized so as to permit a desired gauge of fishing line to pass therethrough while still having sufficient clearance, between an exterior surface of the fishing line and an inwardly facing surface of the body bore, to permit a desired flow of water through the bore and into the baitwell. A removable cover releasably seals an open end of the baitwell. The removable cover has a baitwell bore which is sized so as to permit the desired gauge of fishing line to pass therethrough while still having a sufficient clearance, between the exterior surface of the desired gauge of the fishing line and an inwardly facing surface of the baitwell bore, to permit a desired flow of water and bait therethrough into a surrounding environment.

19 Claims, 8 Drawing Sheets

Fig. 1A

(56) References Cited

U.S. PATENT DOCUMENTS

| | | | | |
|---|---|---|---|---|
| 8,745,916 B1* | 6/2014 | Rutty | .................... | A01K 85/01 |
| | | | | 43/42.35 |
| 8,813,418 B2 | 8/2014 | Sundstrom | | |
| 8,910,415 B2* | 12/2014 | Farr, Jr. | ................. | A01K 85/00 |
| | | | | 43/42.28 |
| 2002/0073607 A1* | 6/2002 | Hickok | ................. | A01K 85/00 |
| | | | | 43/42.25 |
| 2003/0009927 A1* | 1/2003 | Rice | ..................... | A01K 85/16 |
| | | | | 43/42.06 |
| 2006/0042147 A1* | 3/2006 | Jenkins | ................ | A01K 85/16 |
| | | | | 43/42.09 |
| 2011/0214332 A1* | 9/2011 | Partridge | .............. | A01K 85/01 |
| | | | | 43/42.06 |

* cited by examiner

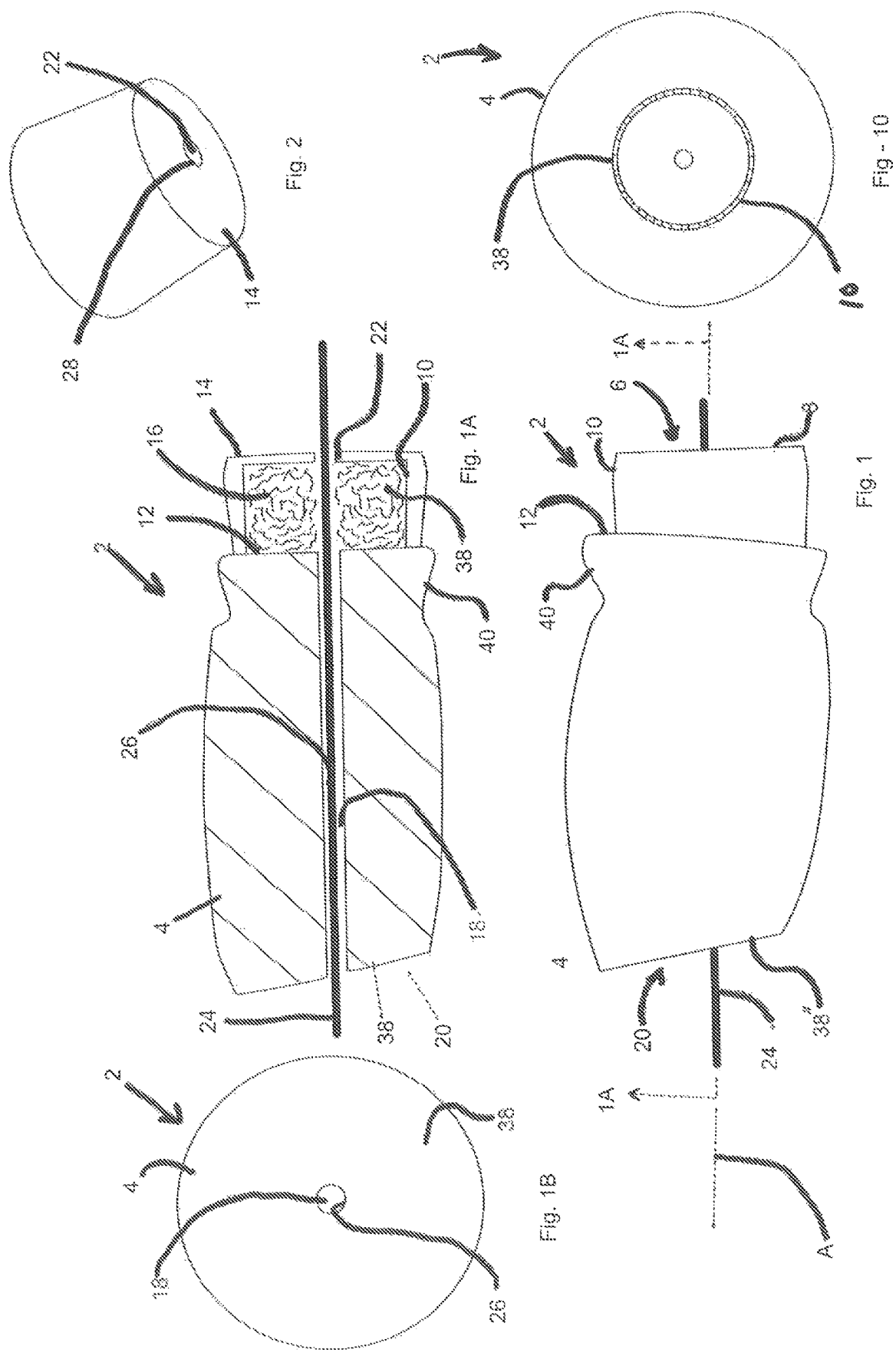

US 11,252,946 B2

FISHING LURE WITH INTERNAL BAITWELL

The present invention relates to improvements concerning a fishing lure comprising a main body with an internal compartment therein for accommodating and captively retaining fishing bait while allowing a minute porting of the fishing bait to exit from the internal compartment generally parallel to the fishing line as the fishing lure travels through water.

BACKGROUND OF THE INVENTION

While a variety of fishing lures are known in the prior art, many of such known lures relate to attaching either live, fresh or fake bait to a hook end of the fishing lure. Such live, fresh or fake fishing bait, directly attached to the hook of the fishing lure, can be easily lost or taken by the fish, during use thereof, thereby requiring repeated replacement of the fishing bait.

A fishing lure which has an internal compartment is disclosed in U.S. Pat. No. 8,813,418 issued Aug. 26, 2014. This fishing lure generally has an internal compartment in which the bait is loaded from the leading end of the fishing lure. The bait internal compartment is not located adjacent the trailing end of the fishing lure and bait which exits from the internal compartment does not generally travel generally along the fishing line toward the one or more hooks of the fishing lure to entice any fishing following the fishing lure.

SUMMARY OF THE INVENTION

Wherefore, it is an object of the present invention to overcome the above mentioned shortcomings and drawbacks associated with the prior art fishing lures.

A further object of the invention is provide a fishing lure which has a baitwell formed at the trailing end thereof and the baitwell is covered by a removable cover.

Yet another object of the disclosure is to extend a body bore completely through the fishing lure and have this body bore communicate with the baitwell so as to permit a fishing line and water to pass through the body bore and communicate with the baitwell.

It is also an object of the disclosure to provide an improved fishing lure comprising: a main body having a leading end and a trading end, and the main body having a baitwell; a body bore extending through the main body of the fishing lure and the body bore being sized so as to permit a desired gauge of fishing line to pass therethrough while still having sufficient clearance, between an exterior surface of the desired gauge of fishing line and an inwardly facing surface of the body bore, to permit a desired flow of water through the bore and into the baitwell; a removable cover releasably sealing an open end of the baitwell; and the removable cover having a baitwell bore being sized so as to permit the desired gauge of fishing line to pass therethrough while still having a sufficient clearance, between the exterior surface of the desired gauge of the fishing line and an inwardly facing surface of the baitwell bore, to permit a desired flow of water and bait therethrough into the surrounding environment.

It is a further object of the disclosure to provide a method of improving a fishing lure, the method comprising: providing a main body with a leading end and a trailing end; forming a baitwell in the main body; extending a body bore through the main body of the fishing lure and the body bore being sized so as to permit a desired gauge of fishing line to pass therethrough while still having sufficient clearance, between an exterior surface of the desired gauge of fishing line and an inwardly facing surface of the body bore, to permit a desired flow of water through the bore and into the baitwell; sealing an open end of the baitwell with a removable cover; and forming a baitwell bore in the removable cover which is sized so as to permit the desired gauge of fishing line to pass therethrough while still having a sufficient clearance, between the exterior surface of the desired gauge of the fishing line and an inwardly facing surface of the baitwell bore, to permit a desired flow of water and bait therethrough into a surrounding environment.

BRIEF DESCRIPTION OF THE DRAWINGS

This invention will now be described, by way of example, with reference to the accompanying drawings in which:

FIG. 1 is a diagrammatic front elevational view showing the various components of the fishing lure according to the disclosure;

FIG. 1A is a diagrammatic cross-sectional view along section line 1A-1A of FIG. 1;

FIG. 1B is a diagrammatic front end elevational of FIG. 1;

FIG. 1C is a diagrammatic rear end elevational of FIG. 1, with the removable cover or cap removed from the cylindrical sidewall, FIG. 2 is a diagrammatic perspective view of the removable cover or cap shown in FIG. 1;

FIG. 4A is a diagrammatic cross-sectional view along section line 4A-4A of FIG. 4;

FIG. 4B is a diagrammatic front end elevational of FIG. 4;

FIG. 4C is a diagrammatic rear end elevational of FIG. 4, with the removable cover or cap removed from the cylindrical sidewall;

FIG. 6A is a diagrammatic cross-sectional view along section line 6A-6A of FIG. 6;

FIG. 6B is a diagrammatic front end elevational of FIG. 6;

FIG. 6C is a diagrammatic rear end elevational of FIG. 6, with the removable cover or cap removed from the cylindrical sidewall;

FIG. 10 diagrammatically shows the fishing lure, according to the disclosure, being utilized in combination with a conventional dredge.

DETAILED DESCRIPTION OF THE INVENTION

Figure 3:
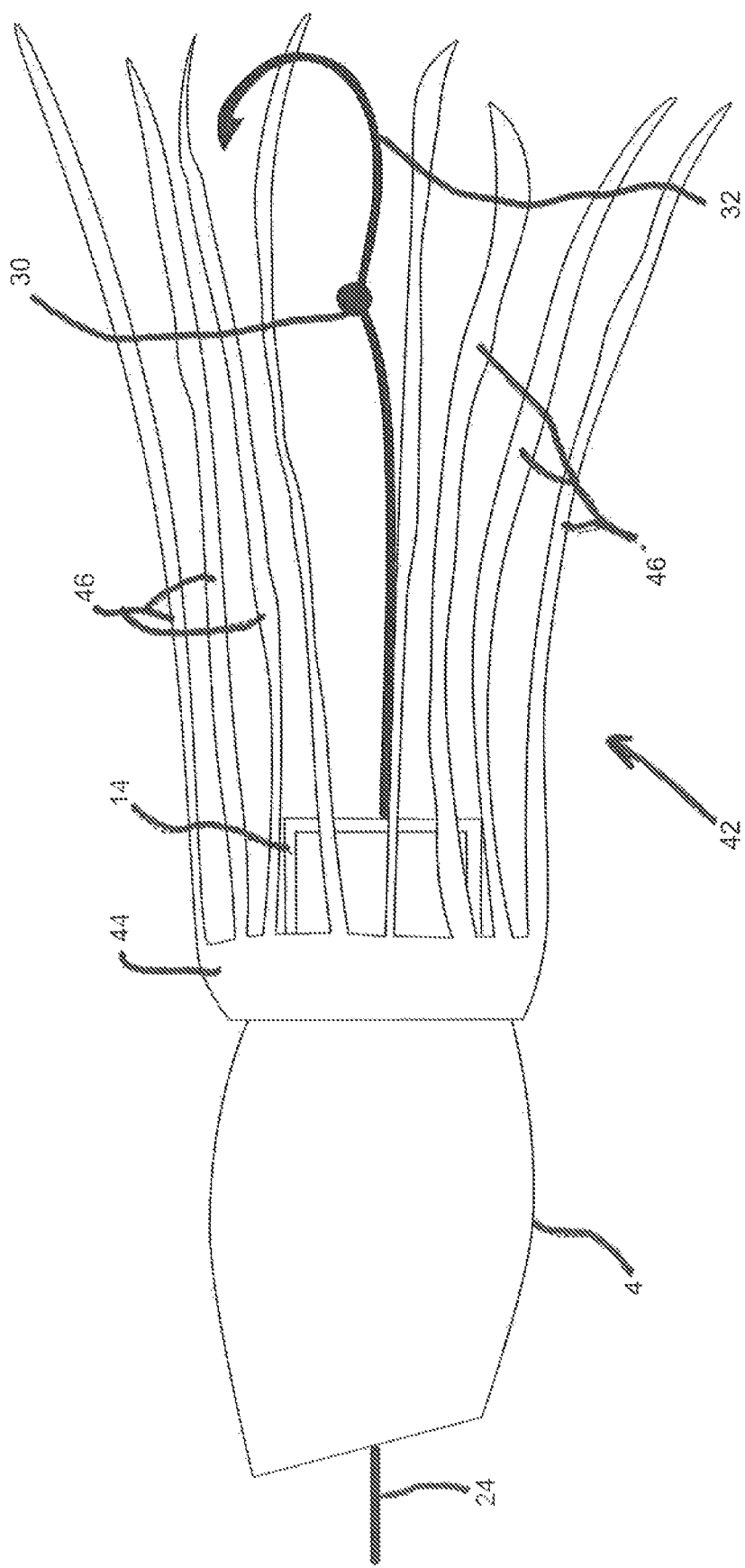
FIG. 3 is a diagrammatic front elevational view of the fishing lure of FIG. 1 with a skirt attached to the trailing end thereof.

With reference now to FIGS. 1-3, a detailed description concerning a first embodiment of the improved fishing lure 2, according to the present invention, will now be provided.

As generally shown in these figures, the fishing lure 2 typically comprises a solid cylindrical main body 4. The main body 4 is designed to provide the fishing lure 2 with a desired buoyancy and facilitate passage of the fishing lure 2 either on top of or through the water. A baitwell 6 is either formed in or at the trailing end 8 of the fishing lure 2, The baitwell 6 typically has a volume of between 0.25 cubic inches and 15 cubic inches, more preferably between 0.5 cubic inches and 10 cubic inches, and most preferably between about 1 cubic inch and about 5 cubic inches. However, it is to be appreciated that the overall shape, arrangement and size of the baitwell 6 can vary, from application to application, depending upon the length of time that the fishing lure 2 is designed to be utilized without requiring the user to replenish again the bait 16 contained within the baitwell 6.

As shown in the drawings, a generally cylindrical sidewall 10 extends or projects from a rear end wall 12 of the main body 4 and this sidewall 10, along with the rear end wall 12 of the main body 4 of the fishing lure 2, together partially define the baitwell 6, In order to complete formation of the baitwell 6, a flexible removable cover or cap 14 releasably engages and passes over the free end of the cylindrical sidewall 10 so as to cover and thereby close the open end of the baitwell 6. The removable cover or cap 14 generally assists with captively retaining any accommodated bait 16 within the baitwell 6 as well as desire dispensing of the bait 16 from the baitwell 6, as discussed below in further detail.

It is to be appreciated that the removable cover or cap 14 is easily and readily removable, to facilitate cleaning thereof after use, and/or replaceable in the event that the same becomes damaged during use. Further, the removable cover or cap 14, when attached to the generally cylindrical sidewall 10 of the main body 4, is preferably attached thereto so that the removable cover or cap 14 does not spin or rotate during use. The lack of rotation or spinning of the removable cover or cap 14, during use, prevents the removable cover or cap 14 from inducing spinning or twisting of the fishing line 24 and thus assists a single prong fishing hook 32 (see FIG. 3) with maintaining a substantially vertical orientation when traveling through the water during use.

Preferably the flexible removable cover or cap 14 is sufficiently attached to the cylindrical sidewall 10 so that the removable cover or cap 14 is not inadvertently removed or disconnected therefrom during use. That is, sufficient force or sufficient effort must be exerted by a user in order to install and/or remove the flexible removable cover or cap 14 from engagement with the cylindrical sidewall 10. For example, the flexible removable cover or cap 14 may have a (internal or external) threaded surface or feature while the cylindrical sidewall 10 may have a mating (external or internal) threaded surface to securely couple those two components with one another and avoid relative rotation therebetween. Alternative, the flexible removable cover or cap 14 may have an annular lip or some other feature while the cylindrical sidewall 10 may have a mating an annular lip or some other feature so that one feature "snaps over" the other feature in order to securely couple or connect those two components with one another. In addition, one or both of the annular lips or other features may have mating a rib(s), projection(s), slot(s), groove(s) etc., which engage with one another so as to prevent rotation of the removable cover or cap 14 relative to the cylindrical sidewall 10. It is to be appreciated that there are a variety of other conventional and well known techniques for coupling or connecting the flexible removable cover or cap 14 with the cylindrical sidewall 10 with one another, which fall within the scope of this disclosure, and still preventing a relative rotation therebetween and thus are not discussed in further detail herein.

A central portion of the removable cover or cap 14 has a central bore or hole 22 formed therein which is generally aligned and/or coincident with the central bore or hole 18 of the fishing lure 2. The pair of central bores or holes 18, 22, formed in both the main body 4 of the fishing lure 2 and the removal cover or cap 14, are each sized to permit a desired thickness or gauge of the fishing line 24 to pass therethrough while still having sufficient clearance, between the exterior surface of the accommodated fishing line 24 and either an inwardly facing surface 26 of the fishing lure 2 or the inwardly facing edge 28 of the removal cover or cap 14, to permit a desired flow of water through the respective central bore or hole 18, 22, and the purpose of such flow of water will become apparent from the following discussion.

As shown in Figures, according to this embodiment, the training end of the fishing line 24 passes through the leading end 20 of the fishing lure 2 and extends along the entire length of the central bore or hole 22 and before exiting from the trailing end of the central bore or hole 18 into the baitwell 6. The fishing line 24 then extends centrally through the baitwell 6 and eventually passes through and exits from the central bore or hole 22 of the removable cover or cap 14. Finally, the trailing end of the fishing line 24 is then secured, e.g., by one or more a conventional fishing knots 30, to a desired fishing hook 32. Each fishing hook 32 is sized and shaped for catching a desired sized fish thereon, depending upon the particular application.

It is to be appreciated that the fishing hook 32 can either be a single prong hook, a double prong hook or, more commonly, a triple prong hook. As noted above, the fishing hook(s) 32 is typically tied, in a conventional manner to the trailing end of the fishing line 24. If desired, the trailing end of the fishing line 24 may support two or more fishing hooks 32 with each fishing hook 32 typically being spaced apart from each adjacent fishing hook 32 by at least a few inches or so.

In order to secure the fishing lure 2 adjacent the trailing end of the fishing line 24 one or more conventional knots 30 are tied in the fishing line 24, at a location upstream from the one or more fishing hooks 32, so as to suitably space the trailing end 8 of the fishing lure 2 a desired distance away from the one or more fishing hook(s) 32. It is to be appreciated that the one or more conventional knots 30 must have an overall diameter/size which is larger than the diameter of the central bore or hole 18, of the fishing lure 2, to prevent the one or more conventional knots 30 in the fishing line 24 from entering into or passing through the central bore or hole 18 so as to thereby maintain a constant distance or spacing between the trailing rear end of the fishing lure 2 and the one or more fishing hook(s) 32. Typically, the fishing hook 32, secured along the fishing line 24 closest to the trailing end 8 of the fishing lure 2, is spaced from the trailing end 8 of the fishing lure 2 by a distance of between 1 inches and 9 inches, typically between about 3 inches and about 7 inches.

Preferably the removable cover or cap 14 has a tight interference fit with sidewall 10 which defines the free open end of the baitwell 6 and permits periodic removal thereof but normally maintains the removable cover or cap 14 in sealing engagement with the free open end the baitwell 6 so as to captively retain the bait 16 therein. In order to facilitate periodic escape of the bait scent and/or a minor portion of the bait 16 from the baitwell 6 into the surrounding water environment, as noted above, a controlled amount of water is permitted to flow into and through the central bore or hole 18 of the fishing lure 2, i.e., between the exterior surface of the fishing line 24 and an inwardly facing surface 26 of the fishing lure 2, and into the baitwell 6. In addition, a controlled amount of water is permitted to flow out through the central bore or hole 22 of the removable cover or cap 14, i.e., between the exterior surface of the fishing line 24 and an inwardly facing edge 28 of the removable cover or cap 14, along the trailing end of the fishing line 24 and into the surrounding water environment so that the bait scent and/or a minor portion of the bait 16 is released from the fishing lure 2 and the scent trails behind the fishing lure 2 as the fishing lure 2 travels through the water.

As a result of this arrangement, as the fishing lure 2 travels through water, some water is permitted to flow into the baitwell 6, via the central bore or hole 18 of the fishing lure 2. As this water enters into the baitwell 6, the water carries along/displaces some of the liquid bait 16 contained within the central bore or hole 22 of the removable cover or cap 14 and generally along the fishing line 24 toward the one or more fishing hooks 32. The bait scent is thus located in the vicinity of one or more the fishing hooks 32 and the bait scent thus entices any fish, following the fishing lure 2, to bite and/or swallow the fishing lure 2. As a result of such arrangement, the bait scent is emitted or emanated from the fishing lure 2, during use, into the water and can be used to attract any adjacent fish to the fishing lure 2 and thereby enhances the effectiveness of the fishing lure 2 in catching fish.

Preferably, the bait 16 is a liquid bait which is manufactured from an oil so that bait 16 is only gradually dispensed from the baitwell 6, thereby minimizing the frequency/amount of times that the baitwell 6 must be replenished with bait 16 by a user during use. Typically the bait 16 is added to the baitwell 6 by a squeeze bottle 34 which has long and narrow funnel shaped dispensing tip 36 which permits the dispensing tip 36 to pass between the exterior surface of the fishing line 24 and the inwardly facing edge 28 of the removable cover or cap 14 and thereby directly communicate with the baitwell 6. Alternatively, the removable cover or cap 14 can be either partially or completely removed from the fishing lure 2 so as to provide direct access to the baitwell 6 and facilitate replenishment thereof.

It is also conceivable that a replenishment port 38 (only shown in dashed lines) may be formed in the cylindrical sidewall 10 of the fishing lure 2, and this replenishment sidewall port 38 is covered by the removable cover or cap 14, when the removable cover or cap 14 is in its normally closed position. When replenishment of bait 16 is required, the removable cover or cap 14 is at least partially removed, peeled back, folded over, etc., to exposed the replenishment port 38 and thereby provide direct access to the baitwell 6 and facilitate replenishment of bait 16 by use of the dispenser.

Due to the above arrangement, no additional openings, slots, apertures, etc., are required to allow the scent of the bait 16 to escape or emanate from the fishing lure 2 into the surrounding water environment and water during use. In addition, the central bore or hole 22 in the removable cover or cap 14 is also sufficiently small so as to generally captively retain the fishing bait 16 within the baitwell 6, even during casting of the fishing lure 2 by a user.

As shown, the leading surface 38 of the fishing lure 2 is generally circular in shape but forms an angle of between 70 and 85 degrees with a longitudinal axis A which extends centrally along the longitudinal length of the fishing lure 2. This angled leading surface 38 of the fishing lure 2 is designed to induce or cause the fishing lure 2 to typically "skip," "bounce," or "hop" along the top surface of the water, as the fishing lure 2 is dragged behind a boat at a trolling speed of 3 to 6 knots, for example.

The trailing end 8 of the fishing lure 2, adjacent the baitwell 6, has a contoured exterior surface 40 which is designed to support a removable flexible skirt 42 which comprises a generally a soft, pliable, flexible material such as rubber, neoprene, polypropylene, a plastic elastomer, for example. The flexible skirt 42 is generally removably but securely attached to the exterior surface 40 of the main body 4 by a continuous band 44 so that the flexible skirt 42 remains is position during use. The continuous band 44 is resilient and stretchable and located adjacent the leading end of the flexible skirt 42. The continuous band 44 is sized that is somewhat small than the exterior diameter of the contoured exterior surface 40 of the fishing lure 2 so as to securely attached the leading end of the flexible skirt 42 to the main body 4 during use of the fishing lure 2.

A plurality of elongate strands 46 are formed integrally with the continuous band 44 and extend therefrom. During use, the elongate strands 46 of the skirt 42 trail behind the fishing lure 2 and partially obstruct/cover/disguise the fishing hook(s) 32 as the fishing lure 2 travels through the water.

It is to be appreciated that the exterior surface of the trailing end 8 of the fishing lure 2, adjacent the baitwell 6, may have two or more contoured annular surfaces 40 which are each designed to support a respective removable flexible skirt 42. If two or more flexible skirts 42 are utilized, then each one of the outer skirt(s) 42 will typically overlap each one of the inner skirt(s) 42. It is also to be appreciated that the flexible skirt(s) 42 may have a variety of different colors and such colors can be beneficial in attracting fish to the fishing lure 2, during use. Preferably, each skirt 42 has a thickness of between about 1/32 of an inch and about 1/4 of an inch or so.

Figure 4:
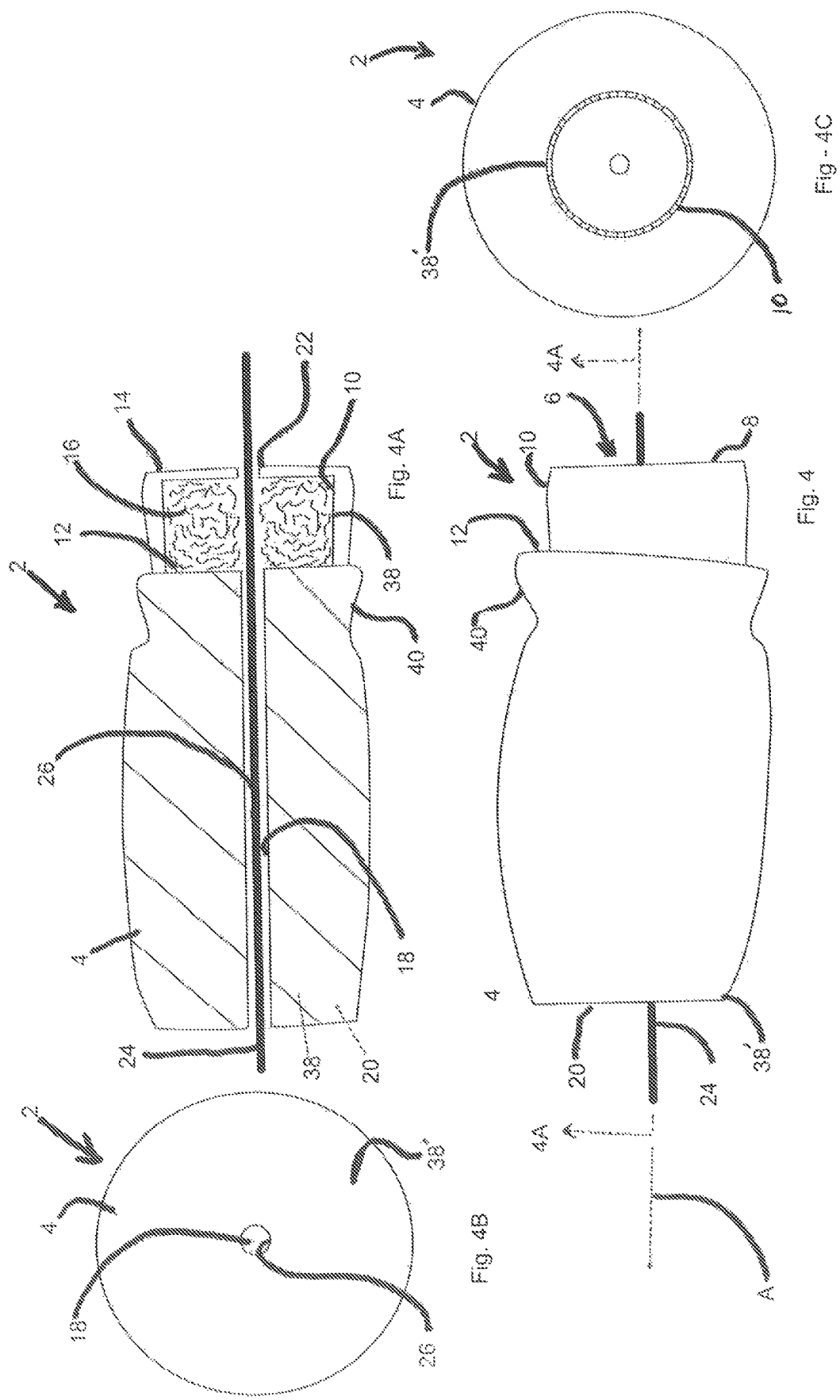
FIG. 4 is a diagrammatic front elevational view showing the various components of a second embodiment of the fishing lure according to the disclosure.
Figure 5:
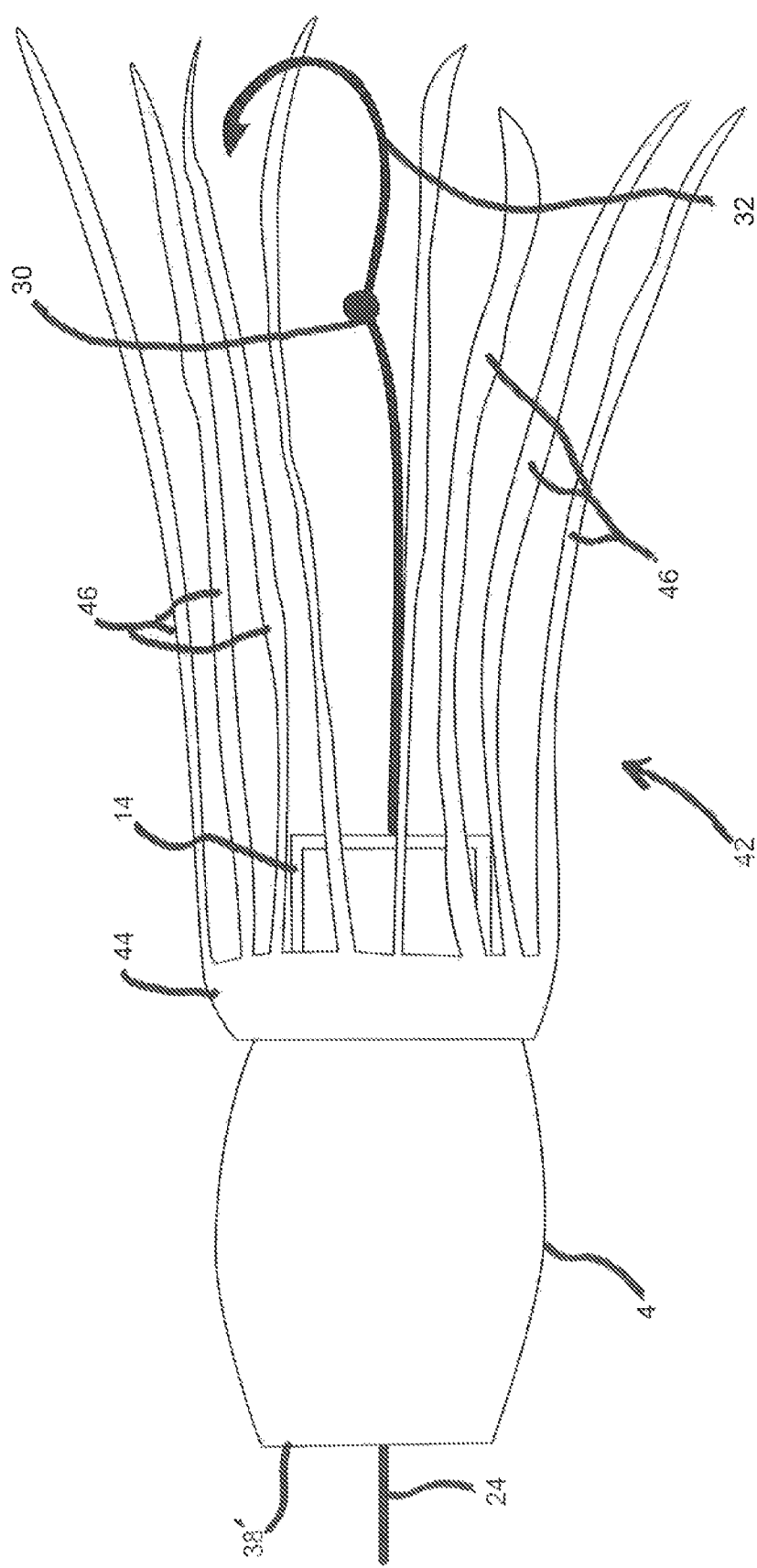
FIG. 5 is a diagrammatic front elevational view of the fishing lure of FIG. 4 with a skirt attached to the trailing end thereof.

With reference to FIGS. 4-5, a brief description concerning a second embodiment of this invention will now be described. As this embodiment is substantially identical to the first embodiment, only differences between the second embodiment and the first embodiment will be discussed in detail.

The major difference between this embodiment and the previous embodiment, is that while the leading surface 38' of the fishing lure 2 is still generally circular in shape, this leading surface 38' forms an angle that is substantially 90 degrees with respect to the longitudinal axis which extends centrally along the length of the fishing lure 2. The leading surface 38 of the fishing lure 2, according to this embodiment, is designed to induce the fishing lure 2 to "push" water as the fishing lure 2 is typically dragged behind a boat at a trolling speed of 3 to 6 knots, for example.

Figure 6:
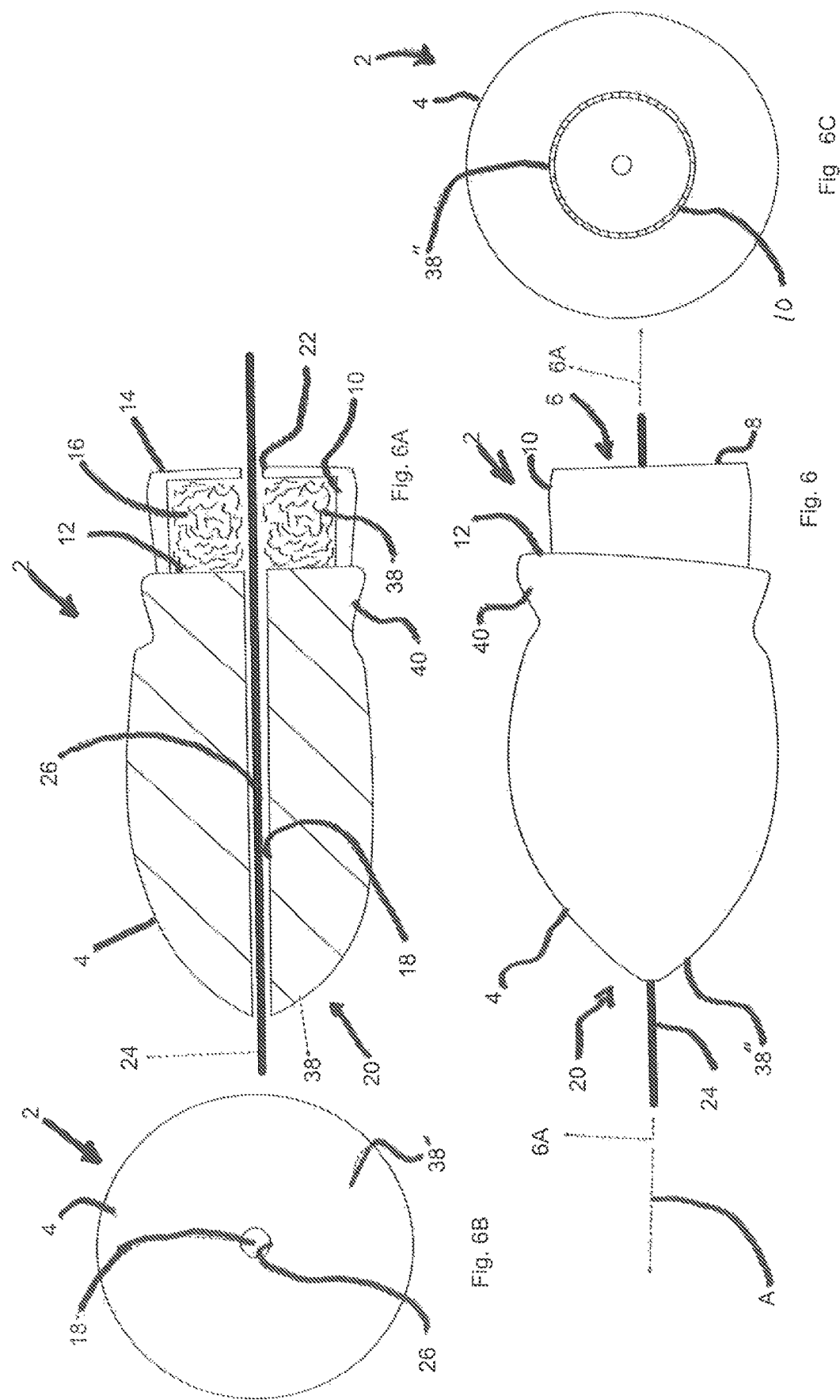
FIG. 6 is a diagrammatic front elevational view showing the various components of a third embodiment of the fishing lure according to the disclosure.
Figure 7:
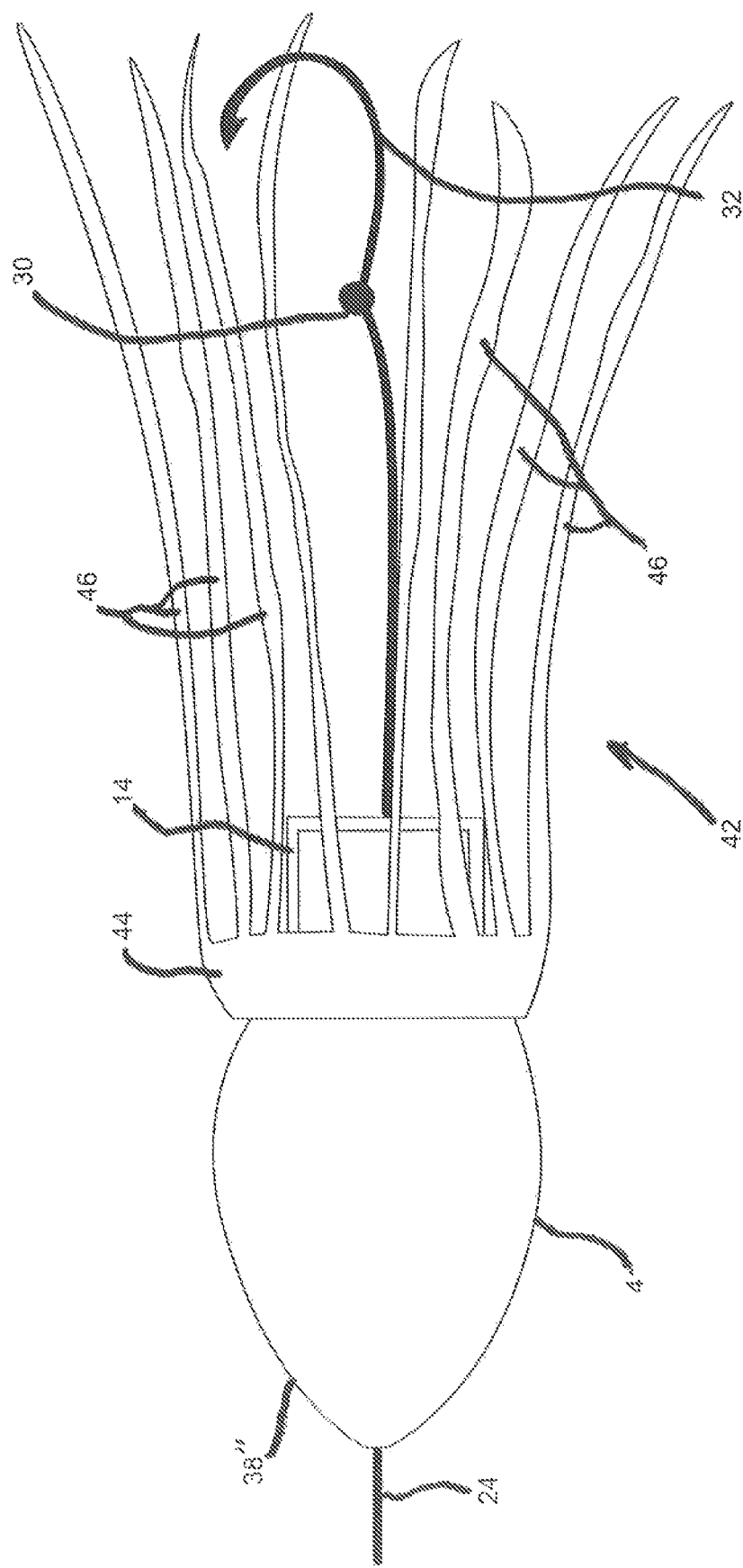
FIG. 7 is a diagrammatic front elevational view of the fishing lure of FIG. 6 with a skirt attached to the trailing end thereof.

With reference to FIGS. 6-7, a brief description concerning a third embodiment of this invention will now be described. As this embodiment is substantially identical to the previous embodiments, only major difference between the third embodiment and the previous embodiments will be discussed in detail.

The major difference between this embodiment and the previous embodiment, is that the leading surface 38" of the fishing lure 2 is generally both rounded and gradually tapers toward a pointed end rather than being circular. That is, the leading end 38" of the fishing lure 2 generally tapers toward a rounded point, somewhat similar to a bullet or some other projectile. The leading surface 38" of the fishing lure 2, according to this embodiment, is designed to permit the fishing lure 2 to be "pulled" through water with reduced friction as the fishing lure 2 is typically dragged behind a boat at a trolling speed of 3 to 6 knots, for example.

The fishing lure 2 is typically cylindrical in shape and comprises a durable material, such as a durable plastic or a metal such as steel, stainless steel, brass, copper, etc. It is to be appreciated that the fishing lure 2 can be used for either salt water or fresh water applications. For salt water applications, the various structural components of the fishing lure 2 are shaped and sized so as to facilitate capturing larger fish whereas, for fresh water applications, the various structural components of the fishing lure 2 are generally reduced in size or miniaturized so as to facilitate capturing smaller fish.

Figure 8:
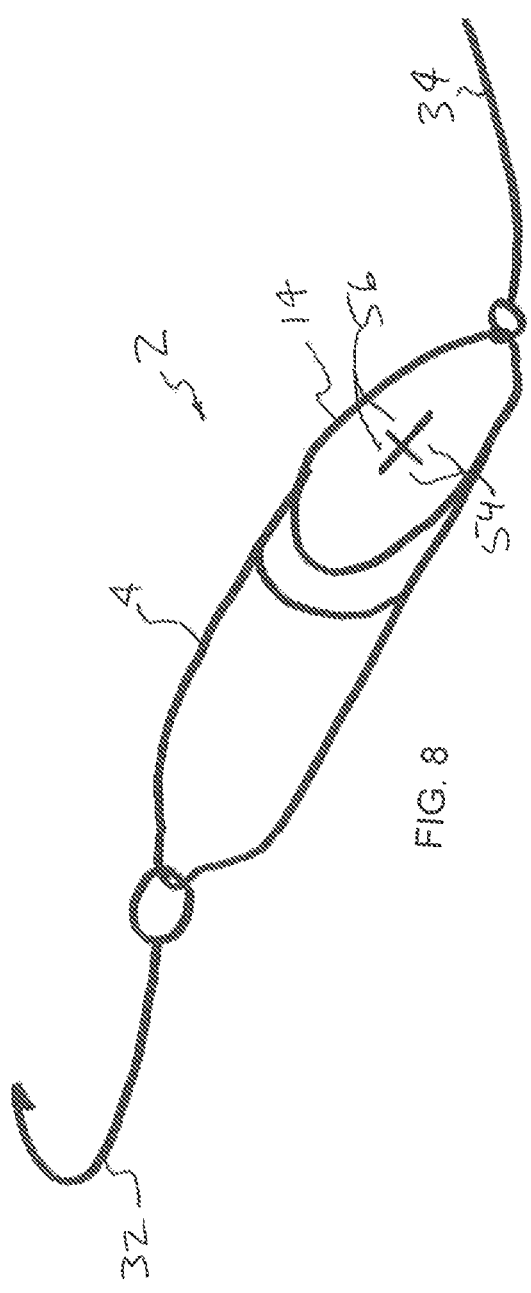
FIG. 8 is a diagrammatic perspective view of further embodiment of a lure having a baitwell located at or in the trailing end of the fishing lure.
Figure 8A:
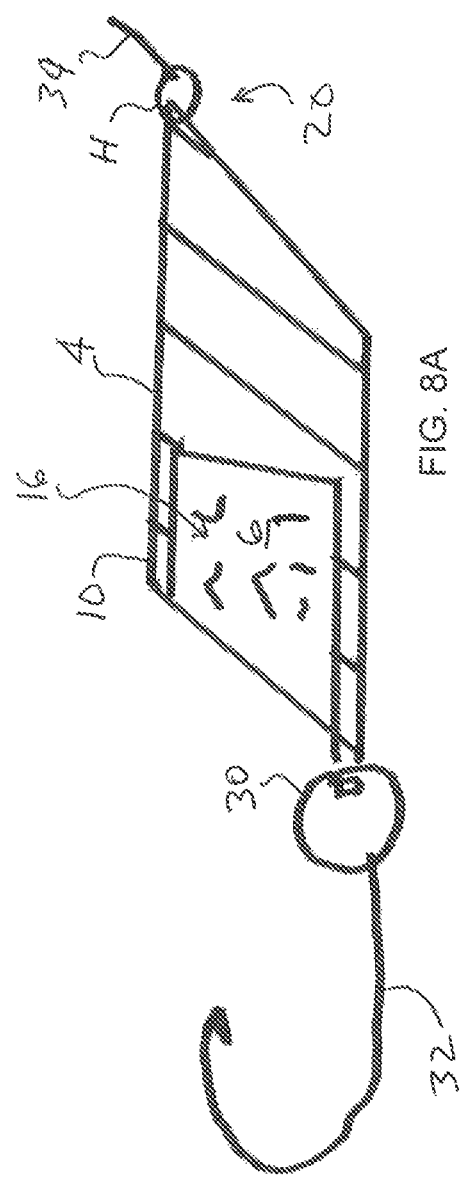
FIG. 8A is a diagrammatic side elevational view of the fishing lure of FIG. 8.
Figure 8B:
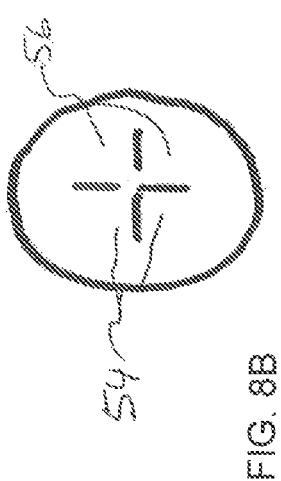
FIG. 8B is an end view of the fishing lure of FIG. 8, along section line 8B-8B of FIG. 8A, showing the rubber membrane for sealing and closing the baitwell.

With reference to FIGS. 8 to 8B, a brief description concerning a fourth embodiment of this invention will now be described. As this embodiment is quite similar to the previous embodiments, only differences between the second embodiment and the first embodiment will be discussed in detail.

As with the previous embodiments, the fishing lure 2 comprises a solid cylindrical main body 4 which provides the fishing lure 2 with a desired buoyancy and facilitates passage of the fishing lure 2 through water, e.g., typically skipping across the top of the water. A baitwell 6 is formed either in or at the trailing end 8 of the fishing lure 2.

However, according to this embodiment, the baitwell 6 is generally formed inside the main body 4 by a generally cylindrical sidewall 10. In order to complete formation of the baitwell 6, a flexible removable cover or cap 14 releasably engages with an internal periphery, or possibly an external periphery, of the cylindrical sidewall 10 so as to cover and thereby close the open end of the baitwell 6. The removable cover or cap 14 generally assists with retaining any accommodated bait within the baitwell 6 as well as desire dispensing of the bait 16 from the baitwell 6, as discussed below in further detail.

According to this embodiment, a central bore or hole does not extend through the main body 4 of the fishing lure 2, but the front leading end 20 of the fishing lure 2 has at least one hole H, or some other conventional attachment member or mechanism, which facilitates attachment of the leading end of the fishing line 24 to trading end of the fishing lure 2 in a conventional manner, e.g., by one or more a conventional fishing knots of a ring member 30. The rear end of the fishing lure 2 has one or more fishing hook(s) 32 secured thereto (only one single prong fishing hook 32 is shown in FIG. 9A).

Typically, a central portion of the removable cover or cap 14 has at least two of flaps (e.g., four flaps as generally shown) 54, 56 which normally mate together with one another so as to generally obstruct and close an access opening of the baitwell 6. The obstruction achieved by the flaps 54, 56 is typically sufficient to facilitate normally retaining the fishing bait within the baitwell 6 of the fishing lure 2. Typically, the flaps 54, 56 together will generally obstruct at least about 90%-100% of the area of the access opening so as to assist with retaining the fishing bait, once loaded therein, within the baitwell 6.

Preferably the removable cover or cap 14 has a tight interference fit with sidewall 10 which defines the free open end of the baitwell 6 and permits periodic removal thereof but normally maintains the removable cover or cap 14 in sealing engagement with the free open end the baitwell 6 so as to captively retain the bait 16 therein. In order to facilitate periodic escape of the bait scent and/or a minor portion of the bait 16 from the baitwell 6 into the water, the user of the fishing lure 2, during use, merely tugs or yanks on the fishing line 24, which, in turn, causes a corresponding tug or yank on the attached fishing lure 2. As the fishing lure 2 is tugged or yanked through the water, a small portion of the bait scent or bait 19 is forced against the inwardly facing surfaces of the flaps 54, 56 which, in turn, increases the force applied against the flaps 54, 56. As a result of this increase in force, the flaps 54, 56 correspondingly bend outwardly a little and thereby partially separate away from one another and permitting a small amount of the bait scent or bait 16 to escape between the flaps 54, 56 and into the water trailing behind the fishing lure 2.

As a result of this arrangement, as the fishing lure 2 travels through water, water does not normally flow into the baitwell 6 of the fishing lure 2. In order to release some of the bait scent or bait 16 contained within the baitwell 6, the user merely tugs or yanks on the fishing line 24 which, in turn, causes a corresponding tug or yank on the attached fishing lure 2. As this occurs, some of the liquid bait 16 contained within the baitwell 6, is discharged out through the flaps 54, 56. The discharged bait scent and/or bait 16 is thus located in the vicinity of one or more the fishing hooks 32 so that the bait scent and/or bait 16 is located so as to entice any fish following behind the fishing lure 2 to bite and/or swallow the fishing lure 2. As a result of such arrangement, the bait scent and/or bait 16 is emitted or emanated from the fishing lure 2, during use, into the water adjacent the fishing lure 2 and can be used to attract any adjacent fish to the fishing lure 2 and thereby enhances the effectiveness of this fishing lure 2 in catching fish.

Figure 9:
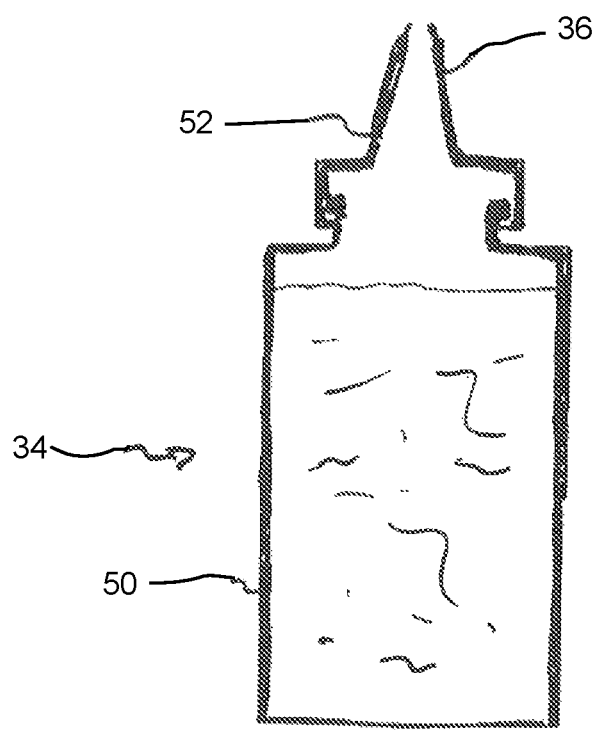
FIG. 9 is a diagrammatic cross sectional view showing a conventional squeeze container which facilitates quick and easy dispensing of the fishing bait, contained within the dispensing container, into the baitwell of the fishing lure.

With reference now to FIG. 9, the squeezable dispensing container or squeeze bottle 34, which facilitates dispensing of bait 16, into the baitwell 6 of the fishing lure 2, will now be described in further detail. As shown in that figure, the squeeze bottle 34 generally comprises a main container body 50 which has a removable cap 52 releasably attached thereto, e.g., by mating threads for example. The removable cap 52 has a tapered, funnel shaped dispensing tip 36. The remote free end of the dispensing tip 36 is open so as to facilitate dispensing of the semi-liquid or liquid bait 16 therefrom by generally squeezing the main container body 50. The squeeze bottle 34 can be, for example, a conventional mustard, ketchup and tarter sauce squeezable dispenser which is commonly found in a restaurant or the like. The squeeze bottle 34 is generally filled with the liquid (oil-based) bait 16 and can be used for rapidly and quickly filling the baitwell 6 of the desired fishing lure 2, as will be described below in further detail.

Loading of the fishing bait 16, via use of the squeeze bottle 34, will now be briefly described. When replenishing the bait 16, the dispensing tip 36 of the squeeze bottle 34 is forced into the central bore or hole 22 formed in the removable cover or cap 14 (or between the flaps 54, 56) so that the free and opening end of the dispensing tip 36 is located within the baitwell 6. Once the dispensing tip 36 is located therein, then the main container body 50 of the squeeze bottle 34 is squeezed so as to displace and expel some of the fishing bait 16 out through the opening provided in the dispensing tip 36 and into the baitwell 6. Once a sufficient quantity of fishing bait 16 is dispensed into the baitwell 6 from the squeeze bottle 34, the dispensing tip 36 is then removed from the central bore or hole 22 formed in the removable cover or cap 14, or from the flaps 54, 56. Typically, the squeeze bottle 34 contains the bait 16 which includes fish oil, minute bait particles and/or other liquid bait components.

If desired, the baitwell 6 may accommodate a wicking or some other absorbing component, such as cotton, or a sponge (not shown) which is capable of absorbing substantially liquid bait 16 (e.g., oils, pheromones, enzymes, amino acids, steroids, etc.) and slowly dispense and/or secrete the absorbed liquid bait 16 as the fishing lure 2 travels through the water. During use of the fishing lure 2, the sponge slowly secretes the adsorbed liquid bait 16 to attract fish to the fishing lure 2. That is, water is permitted to flow into the baitwell 6 and through and around sponge, containing the liquid fishing bait 16 and thereby carry away the scent of the fishing bait 16 through the central bore or hole 22 formed in the removable cover or cap 14.

The fishing lure 2, according to the disclosure, is designed to enhance the appeal or appearance of the fishing lure 2 in order to any fish in the vicinity of the fishing lure 2 thereto. In particular, the fishing lure 2 is designed to emanate a desired bait scent, from the bait 16 contained within the baitwell 6 and thereby attract fish to the fishing lure 2. The fishing lure may also be designed to generate sound, during use thereof, to attract and draw the attention of any adjacent fish to the fishing lure 2, or simulates a desired "swimming" motion which attracts any adjacent fish to the fishing lure 2.

As is known in the art and shown in FIG. 10, the fishing lure 2, according to present invention may be utilized in combination with a conventional dredge 48. The dredge 48 is dragged, e.g., trolled, behind a boat or other vessel (not shown) and comprises a series of lures 50, without any hooks, which are spaced from one another by one or more spreader bars 52 and arranged so as to resemble a school of fish 54 and attract any adjacent fish toward the dredge. At least one of the lures 56 of the dredge will be a fishing lure 2, similar to the present invention, but without any hook being attached to the fishing line coupling the lure 56 to the dredge 48. That is, this fishing lure 56 will merely be emitting bait scent (diagrammatically shown) from the associated baitwell 6 so as to attract any adjacent fish to the dredge.

The dredge 48 will be utilized in combination with at least one fishing lure 2, according to the disclosure, which will be trolling adjacent but along the water surface above the dredge 48, as diagrammatically shown in FIG. 10. Larger fish, which are attracted to the dredge 48, will then be attracted toward the fishing lure 2 and be enticed into bitting/eating the fishing lure 2.

Since certain changes may be made in the above described improved fishing lure, without departing from the spirit and scope of the invention herein involved, it is intended that all of the subject matter of the above description or shown in the accompanying drawings shah be interpreted merely as examples illustrating the inventive concept herein and shall not be construed as limiting the invention.

I claim:
1. An improved fishing lure comprising:
a solid main body formed from a single piece of material having a leading end and a trailing end, and a generally cylindrical sidewall extending from a rear end wall of the main body, and the cylindrical sidewall forming an open end at the trailing end of the main body;
a body bore extending through the main body of the fishing lure from the leading end to the baitwell through rear end wall of the main body and the body bore being sized so as to permit a desired gauge of fishing line to pass therethrough while still having sufficient clearance, between an exterior surface of the desired gauge of fishing line and an inwardly facing surface of the body bore, to permit a desired flow of water through the bore and into the baitwell;
a flexible removable cover releasably sealing the open end of the baitwell, and the rear end wall of the main body, the cylindrical sidewall and the flexible removable cover of the fishing lure, together define the baitwell which has a volume of between 0.25 cubic inches and 15 cubic inches for accommodating bait; and
the removable cover having a baitwell bore being sized so as to permit the desired gauge of fishing line to pass therethrough while still having a sufficient clearance, between the exterior surface of the desired gauge of the fishing line and an inwardly facing surface of the baitwell bore, to permit a desired flow of water and bait therethrough into the surrounding environment.

2. The improved fishing lure according to claim 1, wherein the removable cover permits access to the baitwell to allow the bait to be loaded therein.

3. The improved fishing lure according to claim 2, wherein the baitwell bore is formed in the removable cover so as to permit water to flow out of the baitwell and assist with emanating the scent of the bait out of the baitwell.

4. The improved fishing lure according to claim 1, wherein the main body provides the fishing lure with a desired buoyancy and facilitate travel of the fishing lure either on top of or through the water, and
the baitwell is either formed in or at the trailing end of the fishing lure.

5. The improved fishing lure according to claim 1, wherein the removable cover releasably engages with a free end of the cylindrical sidewall so as to cover and thereby close the open end of the baitwell, and the removable cover assists with captively retaining any accommodated the bait within the baitwell as well as dispensing of the bait from the baitwell.

6. The improved fishing lure according to claim 1, wherein the removable cover facilitates cleaning of the removable cover and baitwell after use and replacement of the removable cover in the event that the removable cover becomes damaged during use.

7. The improved fishing lure according to claim 5, wherein the removable cover has rotation resistant feature which mate with mating feature of the cylindrical sidewall of the main body so as to prevent spinning or rotation of the removable cover, during use, so that the removable cover avoids spinning or twisting of the fishing line whereby a single prong fishing hook, supported by the fishing line, can remain in a substantially vertical orientation when traveling through the water during use.

8. The improved fishing lure according to claim 1, wherein the training end of the fishing line passes through the body bore of the fishing lure and extends along a length of the fishing lure before exiting into the baitwell and extending through a baitwell bore formed in a removable cover, and a fishing hook is fastened to an end of the fishing line.

9. The improved fishing lure according to claim 1, wherein a trailing end of the fishing lure, adjacent the baitwell, has a contoured exterior surface which is designed to support a removable flexible skirt which transitions into a plurality of elongate strips of material which are integral with a flexible casing and move freely through water as the fishing lure travels through water.

10. The improved fishing lure according to claim 9, wherein the flexible casing is manufactured from a pliable, flexible material.

11. The improved fishing lure according to claim 9, wherein the flexible casing is manufactured from one of rubber, neoprene, polypropylene and a plastic elastomer.

12. The improved fishing lure according to claim 1, wherein the baitwell contains a sponge material which is suitable for absorbing liquid bait and dispensing the liquid bait as the fishing lure travels through water.

13. The improved fishing lure according to claim 1, in combination with a squeezable dispensing container which facilitates dispensing of the bait into the baitwell of the fishing lure, the dispensing container comprises a main container body and a removable cap, the removable cap has a funnel shape dispensing tip and a free end of the dispensing tip is open so as to facilitate dispensing of the bait from the dispensing container into the baitwell of the fishing lure.

14. The improved fishing lure according to claim 1, wherein a leading surface of the fishing lure is generally circular in shape and forms an angle of between 70 and 85 degrees with a longitudinal axis which extends centrally along a longitudinal length of the fishing lure so that the fishing lure either skips or bounces along a top surface of the water, as the fishing lure is dragged at a trolling speed during use.

15. The improved fishing lure according to claim 1, wherein the leading end of the fishing lure tapers toward a rounded point which is designed to permit the fishing lure to be pulled through water with reduced friction as the fishing lure is dragged at a trolling speed during use.

16. The improved fishing lure according to claim 1, wherein a central portion of the removable cover has at least two of flaps which normally mate together with one another so as to generally obstruct and close an access opening of the baitwell and assist with retaining the fishing bait, once loaded therein, within the baitwell.

17. The improved fishing lure according to claim 1, wherein the fishing lure is used in combination with a dredge which comprises a series of lures arranged so as to resemble a school of fish and attract any adjacent fish toward the dredge, and at least one of the lures of the dredge has a baitwell for emitting bait scent and attracting any adjacent fish to the dredge.

18. A method of providing an improved fishing lure, the method comprising:
 providing a solid main body with a leading end and a trailing end from a single piece of material;
 forming a baitwell in the main body from a generally cylindrical sidewall extending from a rear end wall of the main body, and the cylindrical sidewall forming an open end at the trailing end of the main body;
 extending a body bore through the main body of the fishing lure and the body bore being sized so as to permit a desired gauge of fishing line to pass therethrough while still having sufficient clearance, between an exterior surface of the desired gauge of fishing line and an inwardly facing surface of the body bore, to permit a desired flow of water through the bore and into the baitwell;
 sealing an open end of the baitwell with a removable cover, and the rear end wall of the main body, the cylindrical sidewall and the flexible removable cover of the fishing lure, together solely defining the baitwell which has a volume of between 0.25 cubic inches and 15 cubic inches for accommodating bait; and
 forming a baitwell bore in the removable cover which is sized so as to permit the desired gauge of fishing line to pass therethrough while still having a sufficient clearance, between the exterior surface of the desired gauge of the fishing line and an inwardly facing surface of the baitwell bore, to permit a desired flow of water and bait therethrough into a surrounding environment.

19. An improved fishing lure consisting of:
 a solid main body formed from a single piece of material having a leading end and a trailing end, and the solid main body having a baitwell formed at the trailing end thereof adjacent a rear end wall of the solid main body;
 a body bore extending completely through the main body of the fishing lure from the leading end to the trailing end and through the rear end wall of the main body, and the body bore being sized so as to permit a desired gauge of fishing line to pass therethrough while still having sufficient clearance, between an exterior surface of the desired gauge of fishing line and an inwardly facing surface of the body bore, to permit a desired flow of water through the bore and into the baitwell;
 a flexible removable cover releasably sealing an open end of the baitwell;
 an outwardly facing surface of the rear end wall of the main body, an inwardly facing surface of the cylindrical sidewall and an inwardly facing surface of the flexible removable cover of the fishing lure together solely defining the baitwell which has a volume of between 0.25 cubic inches and 15 cubic inches for accommodating bait and
 the flexible removable cover having a baitwell bore being sized so as to permit the desired gauge of fishing line to pass therethrough while still having a sufficient clearance, between the exterior surface of the desired gauge of the fishing line and an inwardly facing surface of the baitwell bore, to permit a desired flow of water and bait therethrough into the surrounding environment.

* * * * *